United States Patent [19]
Kato et al.

[11] Patent Number: 4,671,978
[45] Date of Patent: Jun. 9, 1987

[54] FLEXIBLE MAGNETIC DISC SHEET

[75] Inventors: Mikihiko Kato; Shigeo Komine, both of Kanagawa; Katsumi Koyota; Kouji Nakata, both of Tokyo, all of Japan

[73] Assignee: Fuji Photo Film Co., Ltd., Kanagawa, Japan

[21] Appl. No.: 731,417

[22] Filed: May 7, 1985

[30] Foreign Application Priority Data

May 7, 1984 [JP] Japan ................................. 59-89323

[51] Int. Cl.⁴ ............................................... G11B 5/70
[52] U.S. Cl. ........................................ 428/65; 427/44;
 427/128; 427/131; 428/64; 428/323; 428/324;
 428/325; 428/327; 428/329; 428/340; 428/694;
 428/900; 428/425.9
[58] Field of Search ................ 427/44, 54.1, 128, 131;
 428/694, 695, 64, 65, 900, 137, 195, 323, 336,
 324, 325, 327, 328, 329, 330, 331, 340, 425.9;
 360/134–136; 252/62.5 X

[56] References Cited

U.S. PATENT DOCUMENTS

| | | |
|---|---|---|
| 3,466,156 | 9/1969 | Peters ................................. 427/132 |
| 3,681,225 | 8/1972 | Genma ................................. 427/132 |
| 4,239,828 | 12/1980 | Knope ................................. 428/121 |
| 4,335,183 | 6/1982 | Hosaka ................................ 428/694 |
| 4,368,239 | 1/1983 | Nakajima ............................. 428/522 |
| 4,387,114 | 6/1983 | Conner ................................ 427/54.1 |
| 4,404,247 | 9/1983 | Dominquez-Burguette ....... 428/900 |
| 4,434,210 | 2/1984 | Nakajima ............................. 427/44 |
| 4,486,500 | 12/1984 | Naruo .................................. 428/695 |
| 4,523,246 | 6/1985 | Okuzawa ............................. 360/132 |
| 4,539,220 | 9/1985 | Martinelli ............................ 427/128 |
| 4,578,299 | 3/1986 | Kato .................................... 428/65 |
| 4,581,270 | 4/1986 | Kato .................................... 428/65 |

Primary Examiner—Ellis P. Robinson
Attorney, Agent, or Firm—Sughrue, Mion, Zinn, Macpeak, and Seas

[57] ABSTRACT

A flexible magnetic disc sheet is described, which has a central circular hole therein and has a protective layer only on a surface portion surrounding the edge of the central circular hole, the protective layer comprising (a) a radiation polymerized polymer of a compound which is polymerizable and hardenable by radiation and (b) a matting agent.

30 Claims, 6 Drawing Figures

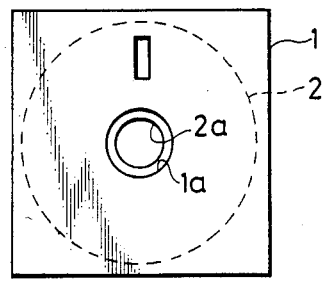
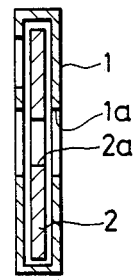
FIG. 1A          FIG. 1B
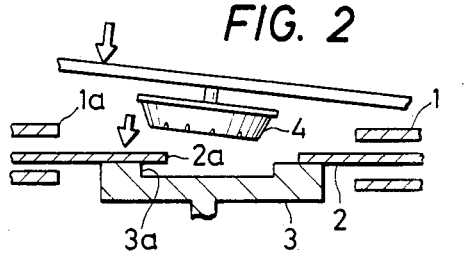
FIG. 2
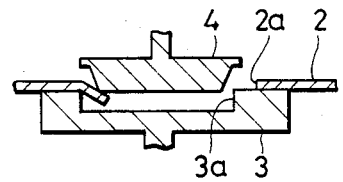
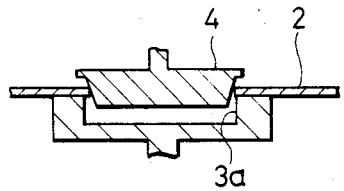
FIG. 3          FIG. 4
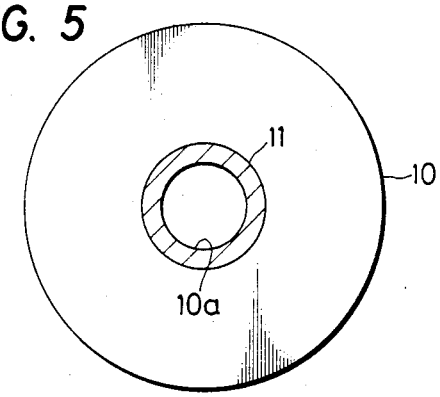
FIG. 5

FLEXIBLE MAGNETIC DISC SHEET

FIELD OF THE INVENTION

The present invention relates to improved flexible magnetic discs. More particulrly, it relates to a flexible magnetic disc which can be loaded on writing and/or reading apparatus without eccentricity.

BACKGROUND OF THE INVENTION

Magnetic recording and playing of a magnetic signal in a flexible magnetic disc comprising a disc sheet in a jacket, involving connecting a sheet-position determining part of a writing and/or reading apparatus to a central circular hole of the jacket and sheet, and rotating the disc sheet (the term "sheet" is also used hereinafter to refer to the disc sheet), is known. For the sheet to be stored in the jacket, a space is provided in a jacket which is slightly larger than the sheet, and thus the sheet in some cases moves to an eccentric position in the jacket during use or storage, with the result that the central circular hole of the sheet deviates from the position of a position-determining part (collet) of the apparatus when disc is loaded on the apparatus, and the sheet may be supported at an eccentric position at the position determining time.

FIG. 1A and FIG. 1B illustrates this type of flexible magnetic sheet, located in a rectangular jacket 1 having a circular open part 1a, with circular flexible magnetic sheet 2 having central circular hole 2a thereof exposed in the afore-mentioned central circular open part 1a, the sheet being stored in the jacket to allow free rotation thereof.

Upon loading this flexible magnetic disc on the writing and/or reading apparatus, rotating part 3 of the position-determining part is fitted from the under part of the sheet 2, and collet 4 is lowered toward the upper part of the sheet and is brought into the circular concave part 3a of rotating part 3 as shown in FIG. 2. A problem that sometimes occurs at this time is that the edge of central circular hole 2a does not always correspond to the position of circular concave part 2a of rotating part 3, and is many times out of proper alignment. If collet 4 is lowered in this state, some part of the portion surrounding the edge of circular hole 2a of the sheet 2 may be pinched between collet 4 and concave part 3a of rotating part 3, such that the sheet rotates eccentrically. Writing and reading cannot be carried out properly unless magnetic disc sheet 2 rotates while being correctly centered corresponding to the central rotating axis. Therefore, such eccentric pinching should very desirably be prevented. Moreover, there exists another problem, viz., that rattling occurs during rotation due to the absence of planarity of the sheet 2 when it is supported and rotated under such an eccentric pinched state.

Upon connecting the sheet 2 by lowering the collet 4, it is necessary that the portion surrounding the edge of the central circular hole of the sheet possesses an appropriate hardness, and that the friction coefficient ($\mu$) between the sheet 2 and collet 4 as well as between the sheet 2 and rotating part 3 is small, in order that the sheet 2 is loaded correctly as shown in FIG. 4, not as shown in FIG. 3.

For this purpose, a method for reducing the friction coefficient by forming a protecting layer containing a polyolefin material polymerizable with ultraviolet light and an ester of an aliphatic acid on a surface portion surrounding the edge of the central hole of a flexible magnetic sheet where a sheet-position-determining part contacts the sheet has been disclosed in U.S. Pat. No. 4,387,114.

However, simply by forming a protecting layer containing resin hardenable and polymerizable with ultraviolet light, the intended purpose cannot be fully satisfactorily attained. Particularly, when such flexible magnetic sheets are piled in such a state that protective layers are in contact at the time of manufacturing magnetic sheets, protective layers adhere each other and blocking occurs due to planarity of the surface of the sheet and the softness of the resin and the like.

Additionally, in some cases the above described protective layer tends to adhere to the rotary portion of the collet when the flexible magnetic sheet is loaded on a disc drive in a cramped state for a long term use under conditions of high temperature and high humidity.

SUMMARY OF THE INVENTION

A first object of the present invention is to provide a flexible magnetic disc sheet maintaining a low friction coefficient between the flexible magnetic disc sheet and the position-determining part without misalignment with the position-determining part.

A second object of the present invention is to prevent adhesion between protective layers on a surface portion surrounding the edge of the central hole of a flexible magnetic disc sheet while being piled upon one another manufacturing of flexible magnetic disc sheets.

A third object of the present invention is to prevent adhesion of the flexible magnetic disc sheet to the rotary portion or the collet when the magnetic flexible sheet is loaded on a disc drive in a cramped state for a long period of time.

The inventors of the present invention have extensively investigated regarding the above described problems, and have found that a very excellent effect can be obtained by providing on a flexible magnetic disc sheet having a central circular hole therein and having a protective layer only on a surface portion surrounding the edge of the central circular hole, the protective layer comprising (a) a radiation polymerized polymer of a compound polymerizable and hardenable by exposure to radiation and (b) a matting agent.

BRIEF DESCRIPTION OF THE DRAWINGS

FIG. 1A is a planar view showing an example of a flexible magnetic disc.

FIG. 1B is a cross-sectional view thereof.

FIG. 2 is a partial cross-sectional view showing the loading of a flexible magnetic disc on a position-determining part of the apparatus.

FIG. 3 is a partial cross sectional view showing a case of loading wherein the sheet is supported eccentrically.

FIG. 4 is a partial cross-sectional view showing a case of loading wherein the sheet is correctly position-determined.

FIG. 5 is a planar view showing a sheet part of an example of the invention.

In FIGS. 1A through 5, 1 is a jacket, 1a is an open hole in the jacket, 2 is a magnetic sheet, 2a is a central circular hole, 3 is a position-determining part (rotating part), 3a is a position-determining part (rotating part), 3a is a circular concave part, 4 is a position-determining part (collet), 10 is a magnetic sheet, 10a is the edge of the central circular hole and 11 is a protective layer.

DETAILED DESCRIPTION OF THE INVENTION

The present invention provides a flexible magnetic disc sheet having a central circular hole therein and having a protective layer comprising (a) a radiation polymerized polymer of a compound polymerizable and hardenable by exposure to radiation and (b) a matting agent only on a surface portion surrounding the edge of the central circular hole.

In a flexible magnetic disc sheet having a central circular hole therein and having a protective layer only on a surface portion surrounding the edge of the central circular hole, the protective layer is formed by exposing to radiation a layer containing a compound which is polyermizable and hardenable by radiation and a matting agent coated on the surface portion.

Alternatively, the protective layer is formed by providing a coating layer comprising a compound which is polymerizable and hardenable by radiation only on the surface portion surrounding the edge of the central circular hole, scattering the matting agent onto the coating layer and exposing to radiation the resultant composite layer.

The compound which is polymerizable by radiation and has an unsaturated bond is a compound having one or more unsaturated carbon to carbon bonds, containing an acryloyl group, an acrylamido group, or an allyl group; a compound having an ether bond with a vinyl compound or a thiovinyl compound; and an unsaturated polyester. Examples of such compound include methyl acrylate and ester of alkyl acrylate as a homologue thereof, styrene and α-methyl styrene and β-chlorostyrene, acrylonitrile, vinyl acetate, and vinyl propionate. Of these, methyl acrylate and methyl methacrylate are preferred. A compound having two or more of unsaturated bond in a molecule can be used. Examples of such compounds are disclosed in *Data Collection of Light-Sensitive Resin*, pages 235 to 236, published by Sogo Kagaku Kenkyusho Co., Ltd., December 1968. Unsaturated esters of polyol such as ethylene diacrylate, diethylene glycol diacrylate, glycerol triacrylate, ethylene diacrylate, or pentaerythritol tetraacrylate and glycidyl acrylate having an epoxy ring are particularly preferred. A compound having one unsaturated bond in a molecule and a compound having two or more of unsaturated bonds in a molecule can be mixed.

These compounds can be high molecular weight compounds. Preferred compounds have an ester bond with acrylic acid at the end of the main chain or side chains of the high molecular structure, and are disclosed, e.g., in *Fatipec Congress*, A. Vrancken, Vol. 11, page 19, 1972. An example is shown below.

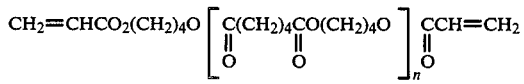

The skeleton of the polymerizable and hardenable compound can be a polyurethane skeleton, an epoxy resin skeleton, a polyether skeleton, a polycarbonate skeleton, or a mixture thereof. Of these, a polyester skeleton and a polyurethane skeleton are preferred. Two kinds or more of molecules can be mixed. The molecular weight of the compound is preferably from 1,000 to 20,000, but is not particularly limited. Further, the above-described monomers and polymers can be used mixed together as the compound that can be polymerizable with electron beams.

The radiation referred to herein includes ultraviolet rays as low energy radiation, and α-rays, X-rays and electron beams as a high energy radiation. Of these, ultraviolet rays are particularly preferred, because the apparatus for generating ultraviolet rays is simple.

When ultraviolet rays are used as the radiation, an aromatic ketone should preferably be added as a photopolymerization initiator. The aromatic ketone is not particularly limited, but a ketone which has a relatively larger absorption coefficient at the wavelengths of 254, 313, and 365 nm (i.e., the line spectrum of a mercury lamp generally used as an ultraviolet irradiation light source) is preferred. Typical examples include various aromatic ketones such as acetophenone, benzophenone, benzoinethylether, benzylmethylketal, benzylethylketal, benzoinisobutylketone, hydroxydimethylphenylketone, 1-hydroxycyclohexylphenylketone, 2,2-diethoxyacetophenone or Michler's ketone. Of these, benzoinethylether and benzylmethylketal are preferred. The aromatic ketones can be used in a mixing ratio of from 0.5 to 20 parts by weight, preferably 2 to 15 parts by weight, and more preferably from 3 to 10 parts by weight, per 100 parts by weight of the polymerizable compound.

In the present invention, a matting agent comprises organic or inorganic fine particle added to coarsen the surface of a protective layer. Examples include zinc oxide, nickel oxide, titanium oxide, silicon oxide, barium sulfate, talc, kaolin, chromium oxide, cadmium sulfide, goethite, alumina, and calcium carbonate. Of these, silicon oxide and alumina are particularly preferred. The friction coefficient can be lowered by surface-treating the surface of inorganic fine particles with organic compounds. Examples of the organic compounds include fluorine-contained compounds and silicone compounds, preferably fluorinated fatty acids and esters thereof having 6 to 22 carbon atoms. Useful organic fine particles include thermoplastic high molecular particles such as acetyl cellulose, polyethylene, polypropylene, polystyrene, thermoplastic polyester, polyamide, polyacrylonitrile, and polyacetal resin powders; and thermosetting high molecular particles such as a phenol resin, a urea resin, a triazine resin, a melamine resin, an epoxy resin, a furan resin, and an acrolein resin, and the like. Particles that are hardened with radiation exposure and those that are insoluble in an organic solvent are preferred. Of these, urea resins and furan resins are particularly preferred. The suitable particle diameter of the fine particles depends upon the thickness of a protective layer, when fine particles are dispersed in a resin and are coated. When the thickness of a protective layer is, for example, 5 μm, an average particle diameter is 0.1 to 10 μm, preferably 1 to 10 μm and more preferably 2 to 8 μm. As the thickness of a protective layer increases, the range of an upper limit and a lower limit increases. It is preferred that the thickness of the protective layer is from 1 to 30 μm after the protective layer is hardened.

A lubricating agent can be incorporated into a protective layer. The lubricating agents used in the present invention includes saturated or unsaturated monobasic fatty acid having from 6 to 22 carbon atoms, esters of fatty acid consisting of saturated or unsaturated monobasic fatty acid having from 6 to 22 carbon atoms and monohydric alcohol having from 3 to 12 carbon atoms and alkoxylated compound thereof ($-OC_nH_{2n+1}$, $n=1$ to 6), fatty acid amide having from 5 to 25 carbon atoms, higher alcohols, silicone oil, mineral oil, edible oils, and fluoride compounds, and other lubricating agents that are generally used for preparing a magnetic recording medium can be used in the present invention. Of these, fatty acids and fatty acid esters are preferred.

The lubricating agent can be used in an amount of from 0.1 to 20 parts by weight, preferably from 1 to 15 parts by weight, and more preferably from 3 to 10 parts by weight, per 100 parts by weight of the compound which is polymerizable and hardenable.

When the above described compound and fine particles are mixed to prepare a coating composition for a protective layer, various organic solvents can be used. When the polymerizable compound is a liquid at a normal temperature, a solvent is unnecessary.

Organic solvents that can be used according to the present invention include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or monoethyl ether of glycol acetate; glycol ethers such as ether, glycol dimethyl ether, glycol monoethyl ether or dioxane; tars (aromatic hydrocarbons) such as benzene, toluene or xylene; and methylene chloride, carbon tetrachloride, chloroform, ethylene chlorohydrin or dichlorobenzene and fluorine-containing solvent. Of these, methyl ethyl ketone is preferred.

To prepare the coating composition for a protective layer the matting agent is portionwise added while stirring using a disperser at about 500 to 1,000 rpm. The resultant coating composition can be coated by means of screen printing, tampon printing, letterpress printing, etc.

The content of matting agent in the coating composition is generally from 1 to 50 parts by weight, preferably from 5 to 30 parts by weight, and more preferably from 10 to 30 parts by weight, per 100 parts by weight of the compound which is polymerizable and hardenable by radiation exposure.

Various methods can be used for coating a matting agent onto the layer containing a compound which is polymerizable and hardenable by radiation exposure. The method for coating and the matting agent using a sprayer is preferred. In this case, inorganic or organic fine particles of the matting agent are dispersed in a solvent as described above and sprayed only on the portion surrounding the edge of the central circular hole of the magnetic sheet as a protective layer, with the rest of the disc sheet being covered to prevent it from being sprayed. The position from where the composition for forming a protective layer is sprayed is adjusted properly so that fine particles are uniformly sprayed. The amount of fine particles sprayed is from 1 to 500 mg/m$^2$, preferably from 5 to 400 mg/m$^2$, and more preferably from 10 to 200 mg/m$^2$.

The width of the protective layer may be varied appropriately depending on the size of the disc sheet. For instance, in the case of a 5.25 inch diameter disc sheet, the width of the protective layer generally is from 2 to 5 mm, preferably is from 2.5 to 3.5 mm, and more preferably is from 2.75 to 3.25 mm. Also preferably, a slight clearance is provided between the edge of the protective layer and the edge of the central circular hole; this clearance is generally from 15 to 500 μm, preferably 30 to 400 μm, and more preferably 50 to 300 μm.

The present invention is further illustrated by the following Examples.

FIG. 5 illustrates an example of the present invention. Along the surface portions surrounding the edge of central circular hole 10a of flexible magnetic disc sheet 10, a protective layer 11 of the present invention was formed on both sides of the sheet. The width of the protective layer was 3 mm. The following shows the composition of the Examples according to this invention and of Comparative Examples.

EXAMPLE 1

| | |
|---|---|
| Polyurethane Acrylate (trademark "M-1100" manufactured by Toa Gosei Chemical Industry Co., Ltd.) | 100 parts |
| SiO$_2$ particles (average particle diameter: 4 μm) | 20 parts |
| Benzoinethylether | 5 parts |
| Butyl Stearate | 5 parts |

EXAMPLE 2

| | |
|---|---|
| Polyurethane Acrylate (trademark "M-1100" manufactured by Toa Gosei Chemical Industry Co., Ltd.) | 100 parts |
| Benzoguanamine Formaldehyde Resin (trademark "FP-100B" manufactured by Nippon Shokubai Kagaku Kogyo Co., Ltd.) (average diameter: 1.5 μm) | 20 parts |
| Benzoinethylether | 5 parts |
| Butyl Stearate | 5 parts |

COMPARATIVE EXAMPLE 1

| | |
|---|---|
| Polyurethane Acrylate (trademark "M-1100" manufactured by Toa Gosei Chemical Industry Co., Ltd.) | 100 parts |
| Benzoinethylether | 5 parts |
| Butyl Stearate | 5 parts |

COMPARATIVE EXAMPLE 2

| | |
|---|---|
| Polyurethane Acrylate (trademark "M-1100" manufactured by Toa Gosei Chemical Industry Co., Ltd.) | 100 parts |
| Graphite (trademark "Valcane XC-72") (average particle diameter: 20 mμ) | 20 parts |
| Benzoin Ethyl Ether | 5 parts |
| Butyl Stearate | 5 parts |

COMPARATIVE EXAMPLE 3

A protective layer was not provided.

Coating solutions consisting of the above-described compositions were prepared by portionwise adding the matting agent to the rest components containing the radiation hardenable compound with stirring using a disperser at about 500 to 1,000 rpm, and applied to the surface portion surrounding the edge of the central circular hole of the flexible magnetic disc sheet by screen printing so that the amount coated was about 10 g/m$^2$, i.e., coating thickness was about 5 μm. Then, the coated layer was polymerized and hardened by exposing to ultraviolet ray using a high pressure mercury lamp of 80 w/cm for 1 second.

EXAMPLE 3

A coating solution having the following composition was prepared by mixing the components with stirring using a disperser at about 500 to 1,000 rpm and was applied to the flexible magnetic disc sheet in the same manner as in Example 1.

| | |
|---|---|
| Polyurethane Acrylate (trademark "M-1100" manufactured by Toa Gosei Chemical Industry Co., Ltd.) | 100 parts |
| Benzoin Ethyl Ether | 5 parts |
| Butyl Stearate | 5 parts |

On the resultant surface was sprayed a 10% suspension of $SiO_2$ powders having an average particle size of 4 $\mu$m in methanol in an amount such that the coated amount is 30 mg/m$^2$ at a distance of 15 cm with covering the area other than that on which a protective layer should be provided.

Then, the resultant layer was exposed to ultraviolet ray in the same manner as in Example 1.

The friction coefficient with upper and lower position determining parts in the afore-mentioned Examples and Comparative Examples were measured, and loading test on a disc drive was conducted under the conditions of 25° C., and 80% RH (relative humidity).

The results are shown in the Table below.

Measurement of the friction coefficient was conducted by rubbing the magnetic sheet with a position-determining part (collet) at a rate of 0.8 mm/sec. under an additional weight of a 70 g weight. The friction coefficient with the other position-determining part (rotating part) was measured similarly.

The drives used for loading tests on disc drives were YD-280 and 380 made by Y-E Data Co., Ltd.; JA 751 and 561 made by Matsushita Tsuko Co., Ltd.; and M-2894 and 4853 made by Mitsubishi Electric Co., Ltd.

The results are shown by A for cases in which the disc was correctly loaded on all drives, and by B for cases in which the disc was uncorrectly loaded on one or more drive upon repeated loadings, i.e., ten times on each drive.

The adhesion degree (%) of the flexible magnetic disc sheet to the rotary part of the disc drive, measured under the conditions of 40° C. and 80% RH, is shown in the Table below. The drive used for mesuring the adhesion degree was YD-480 made by Y-E Data Co., Ltd. Adhesion with the rotary part was observed after the flexible magnetic disc is loaded on the disc drive in a cramped state continuously for 12 hours. The results are shown below.

| | With Collet | With Rotating Part | Loading Test of Disc Sheet with a Disc Drive (%) | Degree of Adhesion to a Rotary Part of a Disc Drive |
|---|---|---|---|---|
| Example 1 | 0.33 | 0.23 | A | 0 |
| Example 2 | 0.34 | 0.24 | A | 0 |
| Example 3 | 0.34 | 0.26 | A | 0 |
| Comparative Example 1 | 0.35 | 0.25 | A | 80 |
| Comparative Example 2 | 0.35 | 0.26 | A | 70 |
| Comparative Example 3 | 0.55 | 0.43 | B | 0 |

The magnetic disc sheets of Comparative Example 1 and 2 exhibited nearly the same friction coefficient with that of the magnetic disc sheets of the present invention and the result of the loading test of the disc sheet on a disc drive was excellent, but adhesion of the magnetic disc sheets to a rotary part of a disc drive occurred. Additionally, when the magnetic disc sheets were stacked on upon another under the conditions of 40° C. and 80% RH, adhesion with each other of the protective layers of disc sheets occurred.

It is clear from the above-described results that the protective layer of the present invention exhibited excellent improvements regarding (1) loading sheets correctly on the disc drive, (2) the effects of preventing adhesion of magnetic disc sheets to the rotary part of the disc drive, and also (3) the effect of preventing adhesion between protective layers while being piled.

Further, the present invention has made it possible in the steps of manufacturing flexible magnetic disc sheets to stack disc sheets one on another after a protetive layer is formed, and thus to enable one to change orders of manufacturing steps freely. In accordance with the present invention, it has also been made possible for users to handle the flexible magnetic disc sheets during the operation of word processors and personal computers under high temperature and high humidity conditions without being concerned about damaging the central circular hole formed on the flexible magnetic disc sheets as well as adhesion between the protective layer and a rotary part or a collet which might tend to occur after long term usage when the disc sheets are in a cramped state.

From a practical viewpoint, the present invention has made it possible that there is no fear of exudation of bonds and deviation of rings occurring in the conventional adhesive hub ring system in numerical controlling apparatus and the terminal apparatus of computers used under high temperature and high humidity conditions in factories.

Further, the present invention has eliminated the problem of deformation of the magnetic disc sheet which occurs due to adhesion of a protective layer when it is unloaded from a disc drive after it has been loaded and used in a cramped state for several days or for several weeks on a disc apparatus, such as a time-card apparatus which is often installed in an unfavorable surroundings (with respect to the temperature and relative humidity), or on a disc apparatus which is generally locked to maintain confidential information.

While the invention has been described in detail and with reference to specific embodiments thereof, it will be apparent to one skilled in the art that various changes and modifications can be made therein without departing from the spirit and scope thereof.

What is claimed is:

1. A flexible magnetic disc sheet having a central circular hole therein and having a protective layer only on a surface portion surrounding the edge of the central circular hole, said protective layer comprising (a) a radiation polymerized polymer of a compound which is polymerizable and hardenable by exposure to radiation and (b) a matting agent, wherein the thickness of the protective layer is from 1 to 30 μm and wherein the matting agent has an average particle diameter of 1 to 10 μm.

2. A flexible magnetic disc sheet as in claim 1, wherein said protective layer being formed by exposing to radiation a layer containing a compound which is polymerizable and hardenable by radiation and a matting agent.

3. A flexible magnetic disc sheet as in claim 1, wherein said protective layer is formed by providing a coating layer comprising a compound which is polymerizable and hardenable by radiation on said surface portion, scattering said matting agent onto said coating layer and exposing to radiation the resultant composition layer.

4. A flexible magnetic disc sheet as in claim 1, wherein said compound which is polymerizable and hardenable by exposure to radiation is selected from the group consisting of a compound having one or more unsaturated carbon-to-carbon bonds, containing an acryloyl group, an acrylamido group or an allyl group, a compound having an ether bond with a vinyl compound or a thiovinyl compound, and an unsaturated polyester.

5. A flexible magnetic disc sheet as in claim 4, wherein said compound which is polymerizable and hardenable by exposure to radiation is selected from the group consisting of methyl acrylate, an ester of alkyl acrylate, styrene, α-methylstyrene, β-chlorostyrene, acrylonitrile, vinyl acetate, and vinyl propionate, and mixtures thereof.

6. A flexible magnetic disc sheet as in claim 5, wherein said compound which is polymerizable and hardenable by exposure to radiation is selected from the group consisting of methyl acrylate and methyl methacrylate.

7. A flexible magnetic disc sheet as in claim 4, wherein said compound which is polymerizable and hardenable by exposure to radiation is a compound having two or more of unsaturated bond in a molecule.

8. A flexible magnetic disc sheet as in claim 7, wherein said compound having two or more of unsaturated bond in the molecule is selected from the group consisting of unsaturated esters of polyol.

9. A flexible magnetic disc sheet as in claim 8, wherein said ester is selected from the group consisting of ethylene diacrylate, diethylene glycol diacrylate, glycerol triacrylate, ethylene diacrylate, pentaerythritol tetraacrylate and glycidyl acrylate having an epoxy ring, and mixtures thereof.

10. A flexible magnetic disc sheet as in claim 4, wherein said compound which is polymerizable and hardenable by exposure to radiation is a compound represented by formula

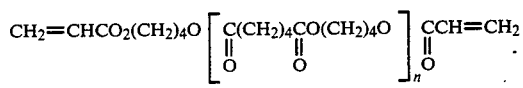

wherein n is 0 or a positive integer.

11. A flexible magnetic disc sheet as in claim 10, wherein said compound has a skeleton selected from the group consisting of a polyurethane skeleton, an epoxy resin skeleton, a polyethylene skeleton, and a polycarbonate skeleton and mixtures thereof.

12. A flexible magnetic disc sheet as in claim 11, wherein said compound has a skeleton selected from the group consisting of a polyester skeleton and a polyurethane skeleton.

13. A flexible magnetic disc sheet as in claim 10, wherein said compound has a molecular weight of from 1,000 to 20,000.

14. A flexible magnetic disc sheet as in claim 1, wherein said radiation is selected from the group consisting of ultraviolet rays, α-rays, X-rays and electron beams.

15. A flexible magnetic disc sheet as in claim 14, wherein said radiation is ultraviolet rays.

16. A flexible magnetic disc sheet as in claim 1, wherein the matting agent comprises organic or inorganic fine particles selected from inorganic fine particles of zinc oxide, nickel oxide, titanium oxide, silicon oxide, barium sulfate, talc, kaolin, chromium oxide, cadmium sulfide, goethite, alumina, and calcium carbonate, and organic fine particles selected from acetyl cellulose, polyethylene, polypropylene, polystyrene, thermoplastic polyester, polyamide, polyacrylonitrile, polyacetal resin powder, phenol resin, urea resin, triazine resin, melamine resin, epoxy resin, furan resin, and acrolein resin.

17. A flexible magnetic disc sheet as in claim 16, wherein the matting agent is selected from the group consisting of silicon oxide, alumina, urea resin, and furan resin.

18. A flexible magnetic disk sheet as in claim 1, wherein the matting agent has an average particle diameter of 2 to 8 μm.

19. A flexible magnetic disc sheet as in claim 1, wherein the width of the protective layer is from 2 to 5 mm.

20. A flexible magnetic disc sheet as in claim 19, wherein the width of the protective layer is from 2.5 to 3.5 mm in the case of a 5.25 inch disk sheet.

21. A flexible magnetic disc sheet as in claim 20, wherein the width of the protective layer is from 2.75 to 3.25 mm in the case of a 5.25 inch disk sheet.

22. A flexible magnetic disc sheet as in claim 1, wherein the clearance between the edge of the protective layer and the edge of the central circular hole is from 15 to 500 μm.

23. A flexible magnetic disc sheet as in claim 22, wherein the clearance between the edge of the protective layer and the edge of the central circular hole is from 30 to 400 μm.

24. A flexible magnetic disc sheet as in claim 23, wherein the clearance between the edge of the protective layer and the edge of the central circular hole is from 50 to 300 μm.

25. A flexible magnetic disc sheet as in claim 2, wherein the content of the matting agent in the coating composition is from 1 to 50 parts by weight per 100 parts by weight of the compound which is polymerizable and hardenable by exposure to radiation.

26. A flexible magnetic disc sheet as in claim 25, wherein the content of the matting agent in the coating composition is from 5 to 30 parts by weight per 100 parts by weight of the compound which is polymerizable and hardenable by exposure to radiation.

27. A flexible magnetic disc sheet as in claim 26, wherein the content of the matting agent in the coating composition is from 10 to 30 parts by weight per 100 parts by weight of the compound which is polymerizable and hardenable by exposure to radiation.

28. A flexible magnetic disc sheet as in claim 3, wherein the matting agent is formed of organic or inorganic fine particles sprayed in an amount of from 1 to 500 mg/m$^2$.

29. A flexible magnetic disc sheet as in claim 28, wherein the matting agent is formed of organic or inorganic fine particles sprayed in an amount of from 5 to 400 mg/m$^2$.

30. A flexible magnetic disc sheet as in claim 29, wherein the matting agent is formed of organic or inorganic fine particles sprayed in an amount of from 10 to 200 mg/m$^2$.

* * * * *